April 20, 1965  J. H. LAMBIE  3,179,475

MASTER PIN FOR CRAWLER VEHICLE ENDLESS TRACK

Filed Nov. 20, 1963

INVENTOR
JAMES H. LAMBIE

BY *Charles C. Schwab*

ATTORNEY

United States Patent Office 3,179,475
Patented Apr. 20, 1965

3,179,475
MASTER PIN FOR CRAWLER VEHICLE
ENDLESS TRACK
James H. Lambie, Springfield, Ill., assignor to Allis-Chalmers Manufacturing Company, Milwaukee, Wis.
Filed Nov. 20, 1963, Ser. No. 325,056
6 Claims. (Cl. 305—58)

This invention relates to a master link construction for crawler vehicle tracks.

It is an object of this invention to provide a master link for an endless track belt which permits easy removal of the master pin by use of common hand tools.

It is a further object of this invention to provide a master link having a master pin which may be easily removed and during removal effects an ejection of a locking pin for the master pin.

It is a further object of this invention to provide a means for locking the master pin of an endless track which is released upon removal of the track shoe.

It is a further object of this invention to provide a master link wherein a minimum of special track components are required.

It is a further object of this invention to provide a master link for track belt which is of rugged construction, inexpensive to manufacture, effective in operation and adaptable in principle for use over a wide variety of tracks.

Figure 1:
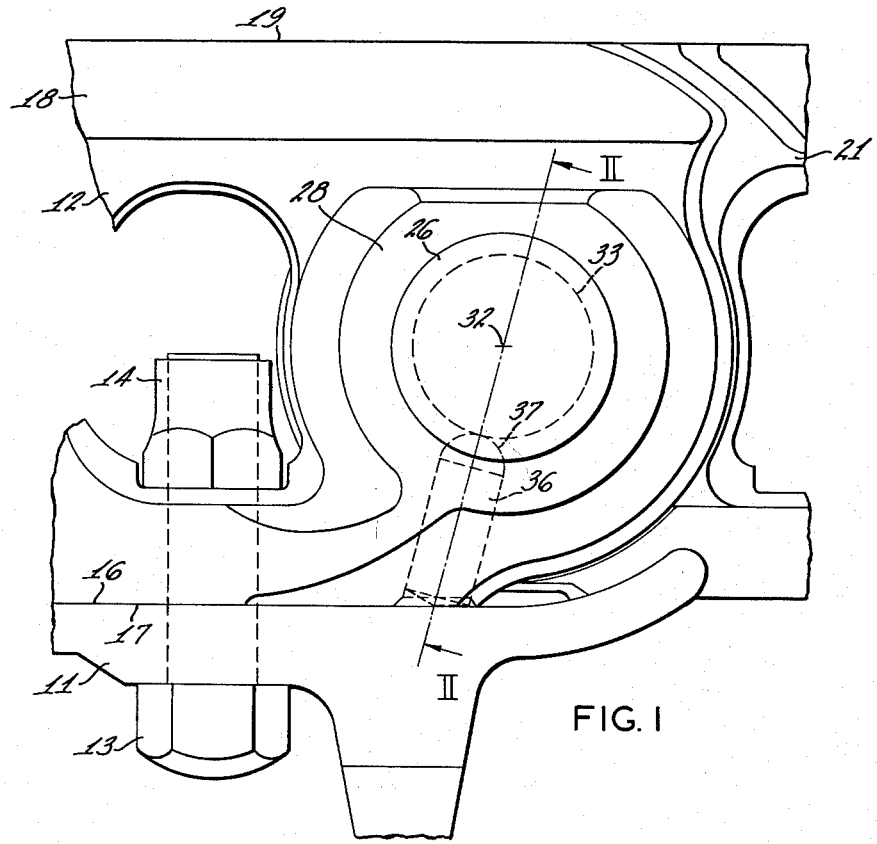
Figure 2:
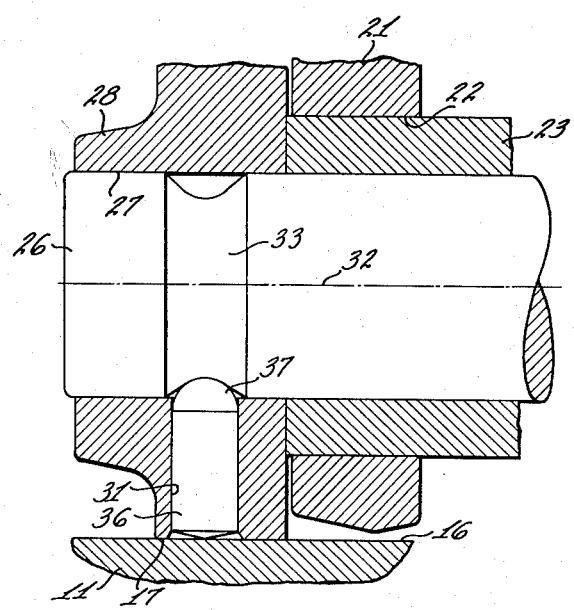

These and other objects of this invention will be apparent to those familiar with the art from the following description upon reference to the drawings in which:

FIG. 1 is a side view of a portion of an endless track in which this invention is incorporated; and FIG. 2 is a section view taken along the lines II—II in FIG. 1.

Referring to FIG. 1, a ground engaging track shoe 11 is secured to the side bar 12 of an endless track by releasable fastening means in the form of a bolt 13 and nut 14. The upper surface 16 of the shoe is in thrust transmitting relation to the shoe engaging shoe mounting surface 17 on the underside of the side bar 12. A rail portion 18 is provided on the upper side of the side bar 12 and presents a roller engaging surface 19. The side bar 21 of the adjoining track link is connected to the side bar 12 through a pin and bushing connection.

As shown in FIG. 2, the side bar 21 has a bushing bore 22 into which a bushing 23 is press fit in a conventional manner. A master pin 26 of special construction is provided and it has a loose to snug fit in the pin bore 27 in the end portion or boss 28 of side bar 12. I prefer to not use a press fit since such a fit makes it harder to remove the master pin. Although the usual practice is to use a light press fit or tighter for master pins, I have found that my master link construction permits use of a one to four thousandths of an inch loose. The walls of pin boss 28 define a hole or tunnel 31 in transverse relation to the axis 32 of the master pin 26 and as illustrated the hole 31 opens at its upper end into the pin bore 27 and opens at its lower end in registering or confronting relation to the shoe 11.

The master pin 26 has a curved camming surface 33 defining a depression or depressed area in the form of an annular recess about the circumference of pin 26 in confronting relation to the upper end of hole 31. To complete the master link, a locking element in the form of a locking pin 36 is removably positioned in the cylindrical hole 31 to lock the pin against axial movement. The lower end of locking pin abuts the shoe 11 and its upper portion presents a spherically shaped camming surface 37 which extends into the recess 33.

The endless track belt in which the present invention may be used, may be disconnected at the master link by removal of the shoe 11 and then by hammering the pin 26 axially with a lightweight hammer. The movement of the pin 26 axially forces the locking pin 36 to move downwardly by camming action of the curved surface 33 and the camming surface 37. The track belt using this construction is relatively easy to remove from a crawler tractor since the master pin 26 is removable with ordinary hand tools. It should be understood that the pin 26 and bushing 23 extend to the right as viewed in FIG. 2, and are connected by a second pair of side bars, not shown, in a conventional manner. Although only one locking pin 37 and groove 33 need by provided for the master link, such an arrangement could be provided at both ends of the pin if desired.

The embodiments of the invention for which an exclusive property or privilege is claimed are defined as follows.

I claim:

1. In a link construction for an endless track belt, the combination comprising:
 a side bar having a shoe mounting surface and a pin boss,
 a pin bore formed in said boss,
 a track pin in said pin bore,
 a shoe releasably secured to said side bar in thrust transmitting engagement with said shoe mounting surface,
 walls defining a tunnel in said boss opening at one end into said pin bore and opening at the other end in confronting relation to said shoe,
 a curved surface defining an annual recess in the circumference of said track pin in confronting relation to said one end of said tunnel and
 a locking element removably positioned in said tunnel in abutting relation to said shoe and having a portion extending into said recess thereby releasably locking said track pin against axial movement.

2. In a link construction for an endless track belt, the combination comprising:
 a side bar having a shoe mounting surface and a pin boss,
 walls defining a pin bore in said pin boss,
 a track pin in said pin bore,
 a track shoe in thrust transmitting relation to said shoe mounting surface,
 fastening means releasably securing said shoe to said side bar,
 walls defining a tunnel in said pin boss opening at one end into said pin bore and opening at its other end in confronting relation to said shoe.
 a camming surface on said pin defining a depression therein in registering relation to said one end of said tunnel and
 a locking element removably positioned in said tunnel in abutting relation to said shoe and having a separate portion extending into said depressed area, said portion and camming surface cooperating to lock said pin against axial movement.

3. The structure set forth in claim 2 wherein said depressed area is an annular recess about the circumference of said pin.

4. The structure set forth in claim 2 wherein said portion of said locking element presents a camming surface in confronting relation to said camming surface on said pin, said locking element being moved out of said depressed area by camming engagement of said camming surfaces upon release of said fastening means and axial movement of said pin.

5. The structure set forth in claim 4 wherein the fit between said pin and bore is looser than a press fit.

6. The structure set forth in claim 5 wherein said depressed area is an annular recess about the circumference of said pin.

References Cited by the Examiner

UNITED STATES PATENTS

| 1,336,876 | 4/20 | Wickersham | 305—58 X |
| 1,575,475 | 3/26 | White | 305—58 |
| 3,027,201 | 3/62 | Blazek et al. | 305—58 |
| 3,101,221 | 8/63 | Waddell | 305—59 |

ARTHUR L. LA POINT, *Primary Examiner.*

UNITED STATES PATENT OFFICE
CERTIFICATE OF CORRECTION

Patent No. 3,179,475                           April 20, 1965

James H. Lambie

It is hereby certified that error appears in the above numbered patent requiring correction and that the said Letters Patent should read as corrected below.

Column 2, line 54, for "shoe." read -- shoe, --; line 55, for "depression" read -- depressed area --; line 58, after "a" insert -- separate --; lines 59 and 60, strike out "separate".

Signed and sealed this 24th day of August 1965.

(SEAL)
Attest:

ERNEST W. SWIDER                                 EDWARD J. BRENNER
Attesting Officer                                     Commissioner of Patents